United States Patent
Brown

(10) Patent No.: US 9,666,919 B1
(45) Date of Patent: May 30, 2017

(54) REFUELABLE ELECTROCHEMICAL BATTERY

(71) Applicant: Wendell Brown, Henderson, NV (US)

(72) Inventor: Wendell Brown, Henderson, NV (US)

(73) Assignee: Wendell D. Brown, Henderson, NV (US)

( * ) Notice: Subject to any disclaimer, the term of this patent is extended or adjusted under 35 U.S.C. 154(b) by 305 days.

(21) Appl. No.: 14/295,238

(22) Filed: Jun. 3, 2014

Related U.S. Application Data

(60) Provisional application No. 61/830,449, filed on Jun. 3, 2013.

(51) Int. Cl.
*H01M 12/08* (2006.01)
*H01M 12/06* (2006.01)

(52) U.S. Cl.
CPC ........... *H01M 12/08* (2013.01); *H01M 12/06* (2013.01)

(58) Field of Classification Search
CPC .............................. H01M 12/06; H01M 12/08
USPC .................................................. 429/404, 405
See application file for complete search history.

(56) References Cited

U.S. PATENT DOCUMENTS

| | | | |
|---|---|---|---|
| 6,558,825 B1 * | 5/2003 | Faris | H01M 6/5011 429/404 |
| 2006/0063051 A1 * | 3/2006 | Jang | H01M 4/36 429/406 |
| 2009/0075170 A1 * | 3/2009 | Cooper | H01M 8/225 429/188 |

* cited by examiner

*Primary Examiner* — Basia Ridley
*Assistant Examiner* — James Erwin
(74) *Attorney, Agent, or Firm* — Park, Vaughan, Fleming & Dowler LLP

(57) ABSTRACT

A refuelable electrochemical battery is provided that features three phases of operation that repeat cyclically. In an intake phase a mixture of electrochemically active particles or pellets (e.g., aluminum pellets) and a suitable electrolyte (e.g., sodium hydroxide, potassium hydroxide) are fed into a cavity or chamber. In a power phase the resulting electrochemical reaction produces electrical energy. The particles are mechanically combined or collected to form one electrode, while a gas-diffusion membrane permeable by oxygen is another electrode. During the exhaust phase, a piston forces the residue of the reaction from the cavity in order to prepare for the next cycle of operation.

20 Claims, 6 Drawing Sheets

Refuelable Electrochemical Battery 100

REFUELABLE ELECTROCHEMICAL BATTERY

RELATED APPLICATION

This application claims priority to U.S. Provisional Patent Application No. 61/830,449, which was filed Jun. 3, 2013 and is incorporated herein by reference.

BACKGROUND

A refuelable electrochemical battery (or cell) and methods of refueling a refuelable electrochemical battery are provided.

Primary and secondary types of batteries or cells have long been used as power sources. A primary battery is generally meant for one-time use, is not rechargeable, and may or may not be recycled. A secondary battery is rechargeable via a process in which the electrochemical process by which electrical energy was generated is reversed. For example, some lithium-ion and nickel-cadmium batteries can be recharged by applying an electrical current.

In addition, reconstructible metal/air batteries have been developed that take advantage of the high energy density of some metals (e.g., zinc), but which must be removed from the equipment they power in order to be refueled and refurbished. For example, Cooper (U.S. Pat. No. 5,434,020) provides a zinc/air battery that must be uninstalled and processed in order to replace the expended metal particles.

Other metal/air batteries, or fuel cells, are refillable via a process that relies upon gravity to ensure proper settling of the metal particles and formation of the metal electrode. For example, Gutierrez (U.S. Pat. No. 6,162,555) provides for feeding particles into cell cavities via flows shaped parallel to the cavities. However, these types of batteries are vulnerable to decreased efficiency resulting from clogging of valves, pores, and/or other conduits designed to allow circulation of the particles and/or an electrolyte. In particular, as some particles are expended, a sludge or paste tends to be formed that can prevent further or complete oxidation of the remaining particles. Attempts have been made to avoid this problem, but still rely upon gravity to combine the metal particles.

Existing metal/air batteries that rely upon gravity to feed metal particles into a cell are vulnerable to loss of power and/or decreased efficiency if they are disturbed or oriented such that gravity acts against the necessary flow of the particles or electrolyte.

SUMMARY

In some embodiments of the invention, a refuelable electrochemical battery is provided that employs mechanical force to aggregate or combine electrochemically active (e.g., metal) particles as one electrode. A gas-diffusion membrane permeable to oxygen acts as the other electrode. The particles are delivered to the cell mixed with or even suspended within a suitable electrolyte.

Operation of the battery involves three stages in some embodiments. An intake stage involves pumping or drawing the fuel (i.e., the electrolyte/particle mixture) into a cell. A power stage commences after the cell is full, or nearly full, as the mechanical force combines or collects the particles and an electrical current is formed by dissolution (e.g., oxidation) of the electrochemically active material. An exhaust stage is initiated when the current fails or falls below a threshold level, involves expulsion of the spent electrolyte (and any remaining particulate matter), and terminates with initiation of another intake stage.

DETAILED DESCRIPTION

Figure 1:
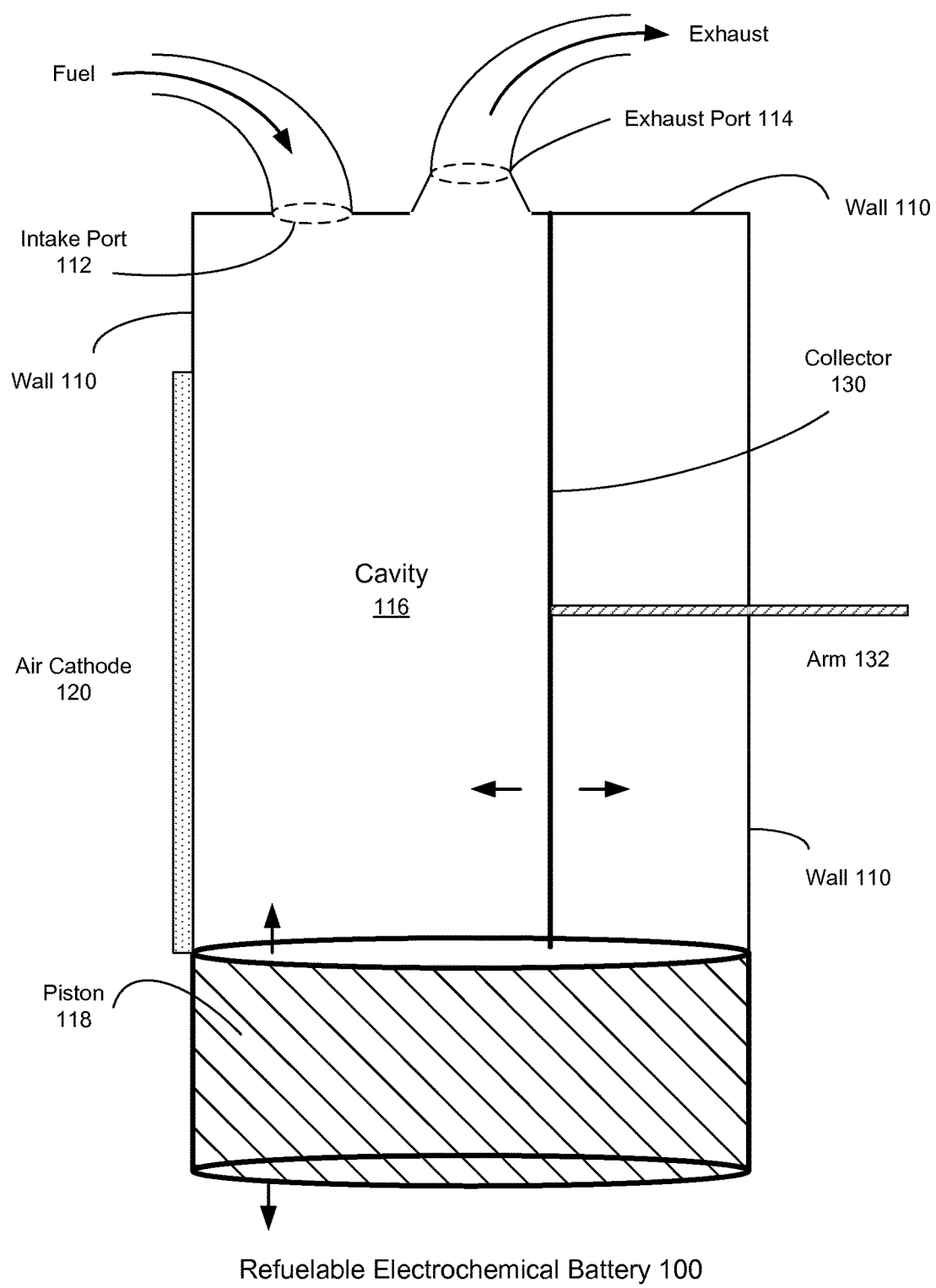
FIG. 1 is a front view of a refuelable electrochemical battery, in accordance with some embodiments of the invention.

The following description is presented to enable any person skilled in the art to make and use the invention. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown.

In some embodiments of the invention, a refuelable electrochemical battery is provided. The battery is refuelable in place, meaning that it need not be removed from its operating position in order to be refueled. In these embodiments, the battery is refueled with a mixture that comprises electrochemically active particles and a suitable electrolyte. In an illustrative implementation, the particles are pellets of aluminum, zinc, or some other metal having relatively high energy density, while the electrolyte may be sodium hydroxide or potassium hydroxide. In other implementations, the particles may be any one of various other elements, minerals, or compounds, and the electrolyte may be any other suitable electrolyzing liquid (e.g., saltwater, vinegar).

In some embodiments, operation of a refuelable electrochemical battery involves three stages or phases: intake, power, and exhaust. During the intake stage, the fuel is drawn or pumped into a cavity through an intake port. During the power stage, the battery produces electrical energy, possibly on the order of magnitude of 1000 watt-hours per kilogram of fuel or electrochemically active material. During the exhaust phase the spent electrolyte and any residue (e.g., zincate, aluminum oxide) is expelled through an exhaust port in order to prepare for another intake stage.

The electrochemically active particles are aggregated or combined to form one electrode (e.g., the anode) or part of one electrode, while the other electrode (e.g., the cathode) is a gas-diffusion membrane that may be in contact with (on one surface) the fuel and that therefore allows oxygen to enter the cavity and react with the fuel. Conductive transfer plates, ribs, struts or other means may be used to assist the current flow. Instead of relying upon gravity to pack the particles into a chemically active or reactive bed, in some embodiments mechanical means are used to collect them and possibly force them into contact with an electrode (e.g., anode) current collector.

In some implementations, for example, a collector component of the battery begins collecting the electrochemically active particles after or at the end of the intake phase, in order to facilitate the power phase. As the particles dissolve, the collector may continue to apply pressure to the remaining particles in order to support continued power generation. At the end of the power phase, the collector retracts or withdraws to allow the exhaust phase to proceed. The collector may comprise a plunger, a gate, an arm, a brush, a wedge, a lever, and/or some other means that mechanically gathers or collects the electrochemically active particles.

In some other implementations, a battery or a battery cavity may rotate during operation (i.e., during the power phase), with sufficient velocity to aggregate or force heavier electrochemically active particles (e.g., those that have dissolved less) to the outer wall(s) of the cavity due to centrifugal force. The residue may thereby be forced into the central portion, from which it may be expelled or extracted. In some implementations, the rotation may assist with expulsion of the residue during the exhaust phase.

In some embodiments, the same or different mechanical means used to collect the electrochemically active particles may operate to empty the cavity during the exhaust phase. For example, a piston or piston-like component may physically force the residue from the battery cavity, and retract to allow or even facilitate refilling of the cavity with fresh fuel.

In some embodiments, the fuel may be a suspension in which the particles are on the order of 1 mm average diameter and are dispersed within the liquid electrolyte. In these embodiments, assuming approximately uniform distribution of the particles in the liquid, pumping a given volume of the fuel into the battery cavity will ensure an appropriate ratio of electrolyte to electrochemically active particles. In other embodiments, the electrochemically active particles are larger and, instead of being uniformly dispersed within the electrolyte, naturally aggregate at the bottom of whatever vessel contains the fuel. In these embodiments, the correct proportion of electrochemically active substance to electrolyte may be ensured by separately feeding the electrolyte and the particles to the battery, or by pre-combining them in the correct amounts prior to (or during) each intake phase.

Due in part to the manner in which the electrochemical battery is refueled or replenished, it may be termed an "electrical generator," an "electromechanichemical engine," a "tertiary cell" (to differentiate it from primary and secondary cells), or may be given some other moniker that reflects its ability to generate electrical energy from an electrochemical process that employs some mechanical force and that is refuelable in place.

In some embodiments, a refuelable electrochemical battery provided herein comprises multiple cells or cavities, such as a bipolar battery in which electrodes are connected in series or in parallel. In addition, multiple separate batteries or battery packs may be provided for powering a load, wherein at least one battery supports the other(s) by powering its/their mechanical component(s), powering the intake and exhaust phases, facilitating a transition from powering the load from one collection of cells to powering the load from a different collection of cells, etc. A combination of multiple batteries may, for example, be formed into two-dimensional or three-dimensional array, depending on weight limits, available space, battery size, etc.

The load that is powered by a refuelable electrochemical battery may be any type of device or equipment that operates on electrical energy. Illustratively, if the load is a vehicle it may be periodically driven to a refueling station that refills a storage tank of the vehicle with fuel and that may receive accumulated residue (e.g., for processing into additional fuel).

FIG. 1 is a diagram of a refuelable electrochemical battery, according to some embodiments of the invention.

Figure 2:
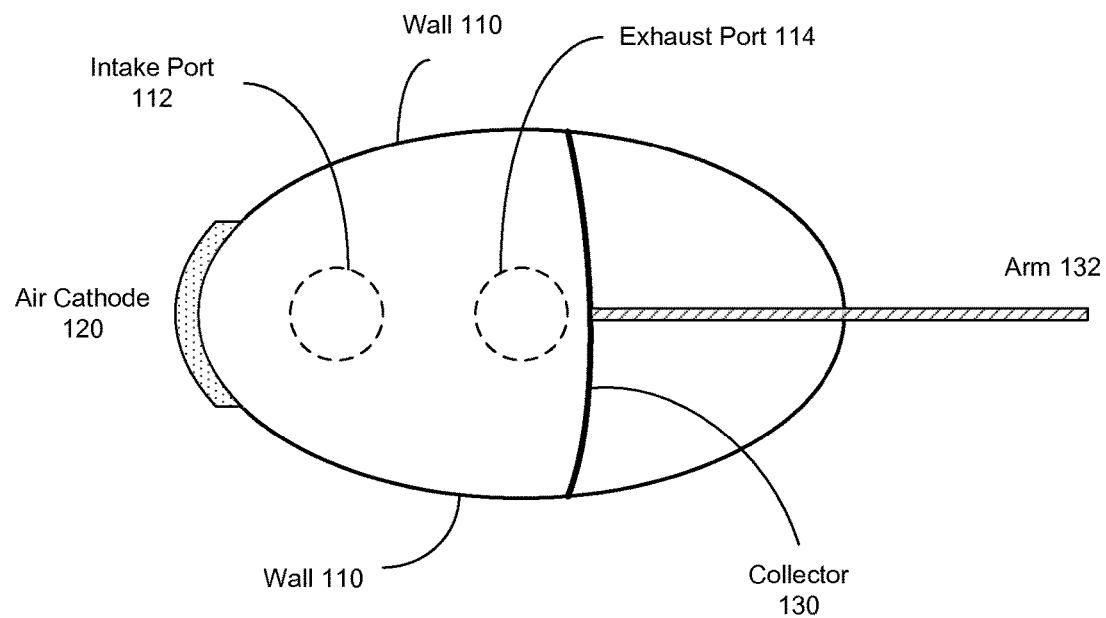
FIG. 2 is a top view of the refuelable electrochemical battery of FIG. 1, in accordance with some embodiments of the invention.

In these embodiments, battery 100 comprises cavity 116 defined by walls 110, and is generally cylindrical in shape (e.g., ellipsoidal (as shown in FIG. 2), circular). The intake phase of operation of battery 100 is marked by a flow of fuel through intake port 112 from a storage tank. Conversely, the exhaust phase is marked by the expulsion of residue through exhaust port 114. Piston 118 assists in the expulsion of the residue. In some implementations, the upper wall of the battery (which hosts ports 112, 114) slopes outward and upward slightly to assist in the evacuation of cavity 116; in other implementations, and as shown in FIG. 1, the exhaust port is offset from the upper wall in addition to or instead of a sloping upper wall.

Cathode 120 is oxygen-permeable, from an air side external to battery 100 and into cavity 116, wherein the oxygen can react with the fuel mixture to feed the electrochemical action. Thus, one (interior) surface of cathode 120 forms part of wall 110, and may be wettable by the fuel mixture. In some implementations, however, an insulating separator (e.g., a wettable fabric) covers the interior surface of cathode 120 but does not impede (or does not significantly impede) the current flow. One or more conductive components (e.g., plates, ribs, struts, strips, ribbons) may assist current flow toward the cathode.

Collector 130, which is connected to arm 132 for extending or retracting the collector, is shown in a partially deployed or extended orientation. As is more clearly shown in another figure, the collector may comprise a flexible and relatively sturdy mesh or perforated surface through which the liquid electrolyte can pass, but which collects electrochemically active particles that are larger than the perforations, and presses them to or toward air cathode 120.

In some implementations, collector 130 is metallic and acts as a current collector. In some other implementations and as indicated above, a similar (anode) current collector is provided in the form of a plate, a mesh, or other conductive transfer surface(s) situated adjacent to and in contact with a porous insulating separator that, in turn, covers air cathode 120 (internal to battery 100). Thus, the (anode) current collector(s) collects electrical charges emitted by the electrochemically active particles as they dissolve, and transfers them toward cathode 120. Although not shown in FIG. 1, one (positive) current lead may be coupled to or embedded within air cathode 120, and another (negative) lead may be coupled to collector 130, arm 132, or some other anode current collector or transfer entity that is coupled to the electrochemically active particles.

During the intake phase of battery 100, piston 118 withdraws from the upper wall, or is already in the retracted position shown in FIG. 1 before the intake phase begins. After cavity 116 has been (substantially) filled with fuel, or a predetermined amount of fuel has been introduced into cavity 116, piston 118 is in the position shown in FIG. 1 and collector 130 extends toward air cathode 120 in order to sweep the electrochemically active particles of the fuel toward the cathode and to place them in contact with a current collector or transfer component.

After a predetermined period of time, or after the electrical output of the battery fails or falls below a predetermined level, or upon some other trigger, collector 130 retracts to and/or flush with a wall 110. The exhaust phase then commences with piston 118 moving upward (in the embodiments of FIG. 1) to force the residue and any remaining fuel from cavity 116, after which another intake phase begins.

In some implementations, collector 130 extends and retracts in response to extension and retraction of arm 132 (e.g., a screw, a rod), which may be powered by a different battery. In some implementations, instead of arm 132, which may pierce a wall 110 of the battery, means for extending and retracting collector 130 may be completely internal to the battery, such as a mechanism similar to a scissors lift. In other implementations, a collector component has a different form altogether (e.g., one or more movable gates or panels).

In yet another implementation, multiple arms 132 are used to make contact with multiple areas of collector 130 instead of a single joint. In a further implementation, arm 132 has a much greater height or vertical dimension so that instead of apply mechanical force on just a small area of collector 130, it contacts the collector along the majority of the collector's height, and may be envisioned as a wall that is orthogonal to collector 130 as shown in FIG. 1.

Some components of a refuelable electrochemical battery, or of a battery system or apparatus are omitted. For example, a digital processor may be coupled to the battery to control its operational cycles and phases, wires or other conductors carry the electrical current, a piston rod or other connecting element couples piston 118 to a cam or other mechanism for operating the piston, etc. The exterior casing of battery 100 (including walls 110) may be constructed of a heavy duty plastic or other non-conductive material.

Figure 3:
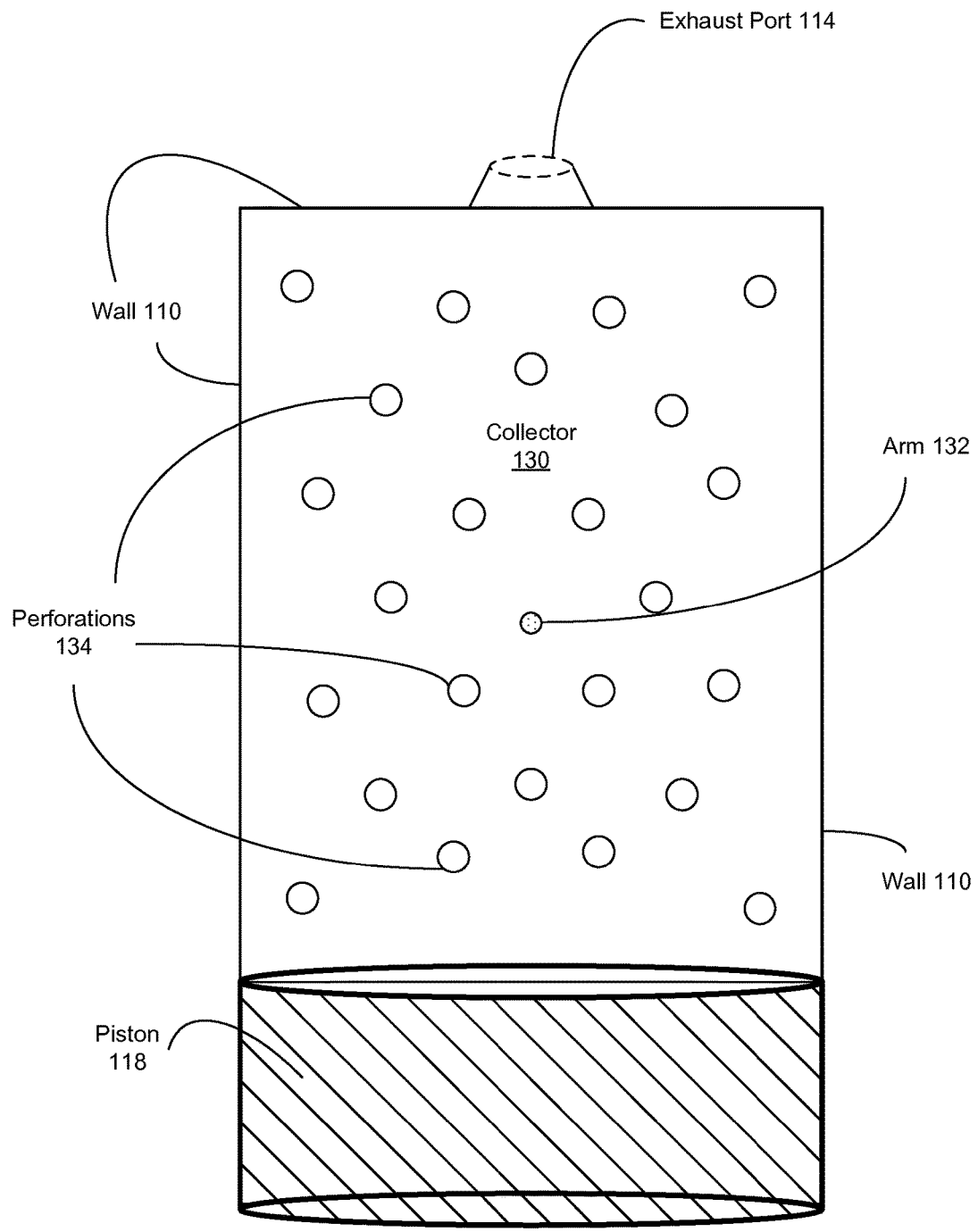
FIG. 3 is a right-side view of the refuelable electrochemical battery of FIG. 1, in accordance with some embodiments of the invention.

FIGS. 2 and 3 are top and right-side views, respectively, of the refuelable electrochemical battery of FIG. 1, according to some embodiments of the invention.

FIG. 2 shows air cathode 120 adjacent to a portion of the surface of a wall 110, and may extend for any portion of the vertical height of the battery. Generally, however, a bottom edge of cathode 120 is coplanar with a top edge or surface of piston 118 when the piston is retracted as shown in FIG. 1. The dimensions of the gas-diffusion membrane of air cathode 120 may vary from one implementation to another, depending on the necessary transfer rate of oxygen, for example.

Also as shown in FIG. 2, flexible collector 130 may have dimensions such that it is approximately full extended vertically and horizontally (in a substantially rectangular shape) when it is located near the midpoint of the battery's cavity. Illustratively, it may bend to conform to the contour of the interior surface of the battery as it extends or retracts, such that it may have a convex aspect when fully extended (or retracted) and a concave aspect when fully retracted (or extended). In some embodiments, cavity 116 may feature horizontal groves and edges of collector 130 may feature extensions that ride in the grooves to guide it during extension/retraction. In some embodiments in which the collector component acts as a current collector, it may transfer that current through conductive ribs or guides within the grooves and to another current collector near or adjacent to cathode 120. Current collected by the collector may be conducted toward the cathode in other ways in other embodiments.

As shown in FIG. 3, collector 130 of battery 100 is perforated to allow electrolyte to pass through it as it collects the electrochemically active particles to or toward air cathode 120. It may be noted that the average diameter of perforations 134 may be (substantially) smaller than the average diameter of the particles, so as to ensure collection of virtually all of the particles.

In some embodiments, a battery cavity may be rectangular, in which case collector 130 of FIGS. 1-3 may be rigid, of dimensions that are compatible with the interior of the cavity, and it may maintain a uniform aspect as it is extended and retracted.

Figure 4A:
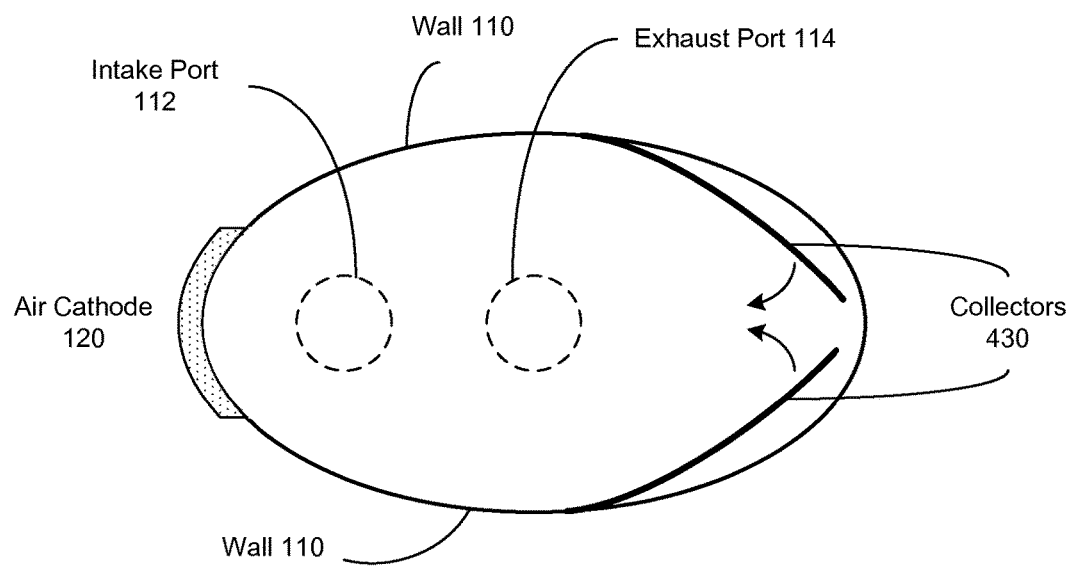
FIGS. 4A-B are top views of a refuelable electrochemical battery in accordance with some embodiments of the invention.
Figure 4B:
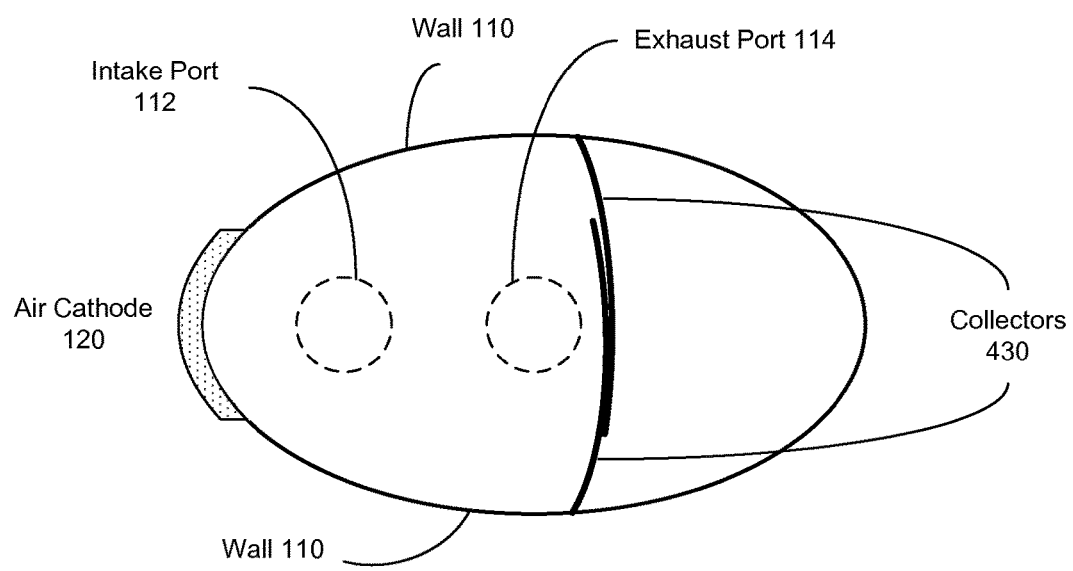

FIGS. 4A-B are top views of a refuelable electrochemical battery according to some embodiments of the invention. In these embodiments, the collector component is implemented as a pair of gates 430 that sweep the electrochemically active particles together as they are deployed/extended. In FIG. 4A, the collectors are connected to pivots (not shown) in opposing walls 110, and have just begun to deploy from the positions they assume during the intake and exhaust phases, wherein they are flush or nearly flush with the opposing walls. In FIG. 4B, the collector gates are partially deployed (or fully deployed in some implementations).

In other embodiments the gates are installed on other walls. For example, one gate may have a resting position flush with the top surface of piston 118, while another gate has a resting position flush with the interior surface of a side wall of the battery.

Figure 6A:
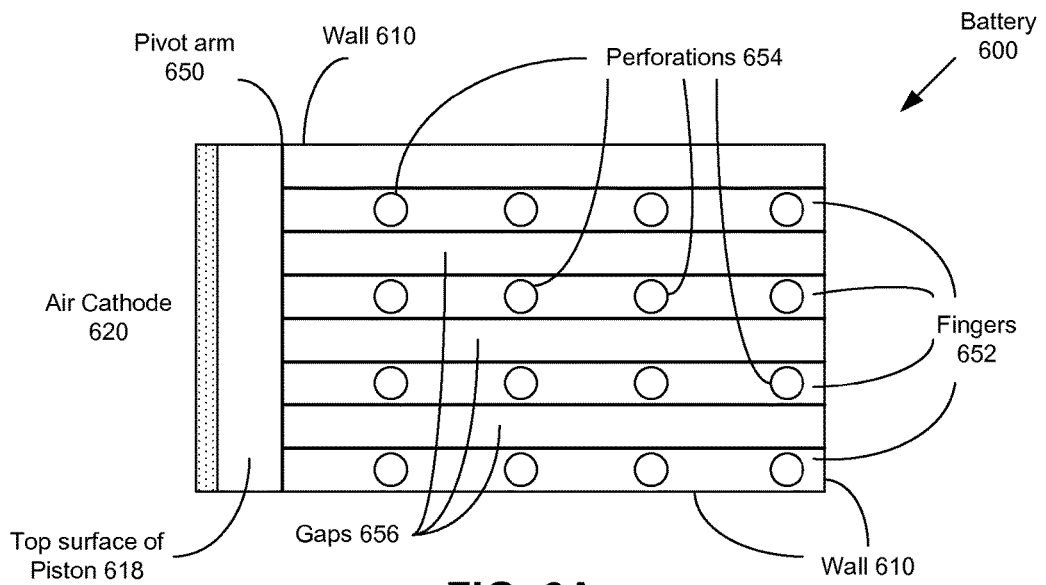
FIGS. 6A-B are top and front views of a refuelable electrochemical battery, in accordance with some embodiments of the invention.
Figure 6B:
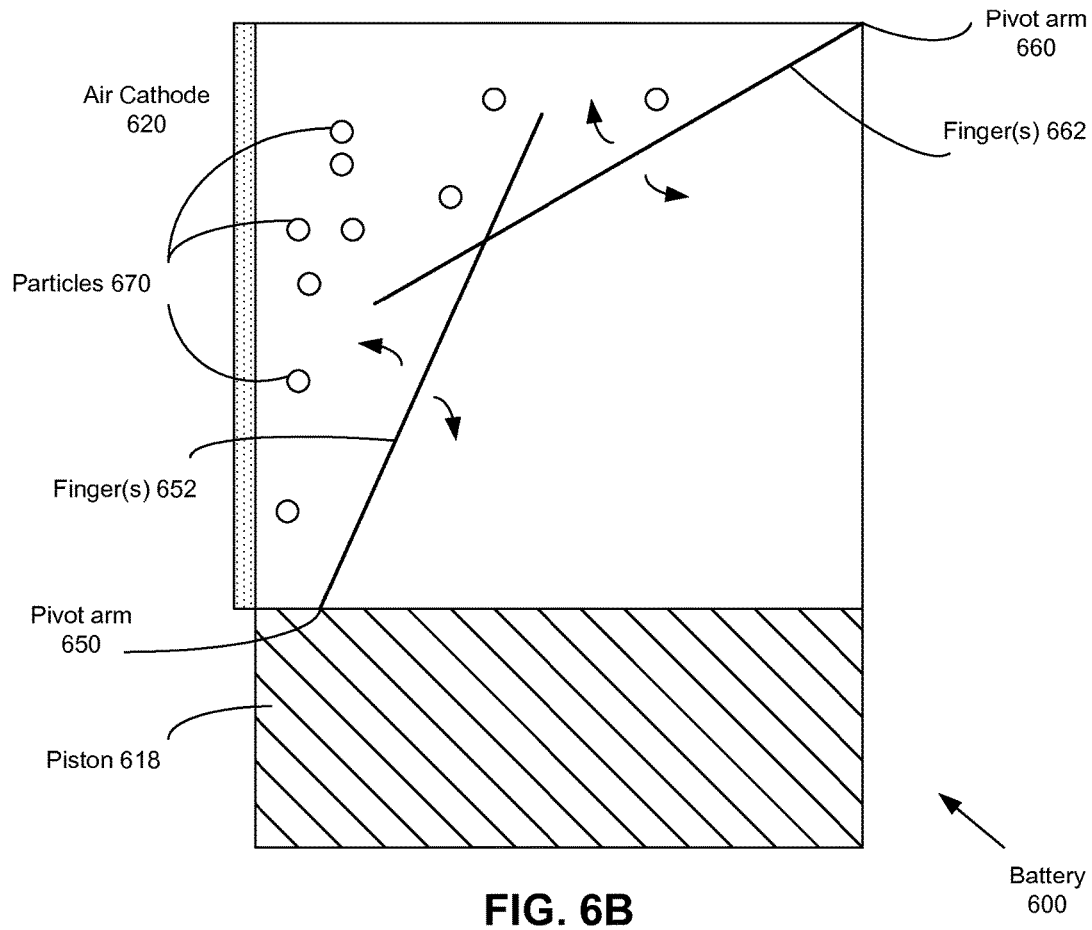

FIGS. 6A-B are top and front views of a refuelable electrochemical battery, according to some embodiments of the invention. In these embodiments, a collector comprises multiple interlocking or interlaced sweeps or combs for gathering electrochemically active particles. Together, the components filter the fuel mixture to mechanically gather the particles.

In the top view of FIG. 6A, intake and exhaust ports are not shown, in order to more clearly illustrate the collector components. FIG. 6A provides a view of a first collector, anchored to the top of piston 618 by pivot arm 650 and comprising multiple rigid or semi-rigid fingers 652 separated by gaps 656. Each finger has one or more perforations 654, which may or may not be aligned as shown in the figure.

During the power phase of operation of battery 600, and as shown in the front view of FIG. 6B, fingers 652 of the first collector interlace with fingers 662 of a second collector anchored to a wall 610 at pivot arm 660. In particular, fingers 662 of the second collector fit within gaps 656 of the first collector, and fingers 652 of the first collector fit within gaps of the second collector. The second collector may be virtually identical to the first collector except for its orientation. In the power phase, the collector components force electrochemically active particles 670 of the fuel toward air cathode 620.

In some implementations, the collector components of battery 600 also collect current that may be fed through pivot arms 650, 660, and may further be conducted toward a current collector located near cathode 620 (e.g., possibly separated by a suitable wettable insulator), perhaps via conductors embedded in one or more walls of the battery and/or the surface of piston 618.

Figure 5:
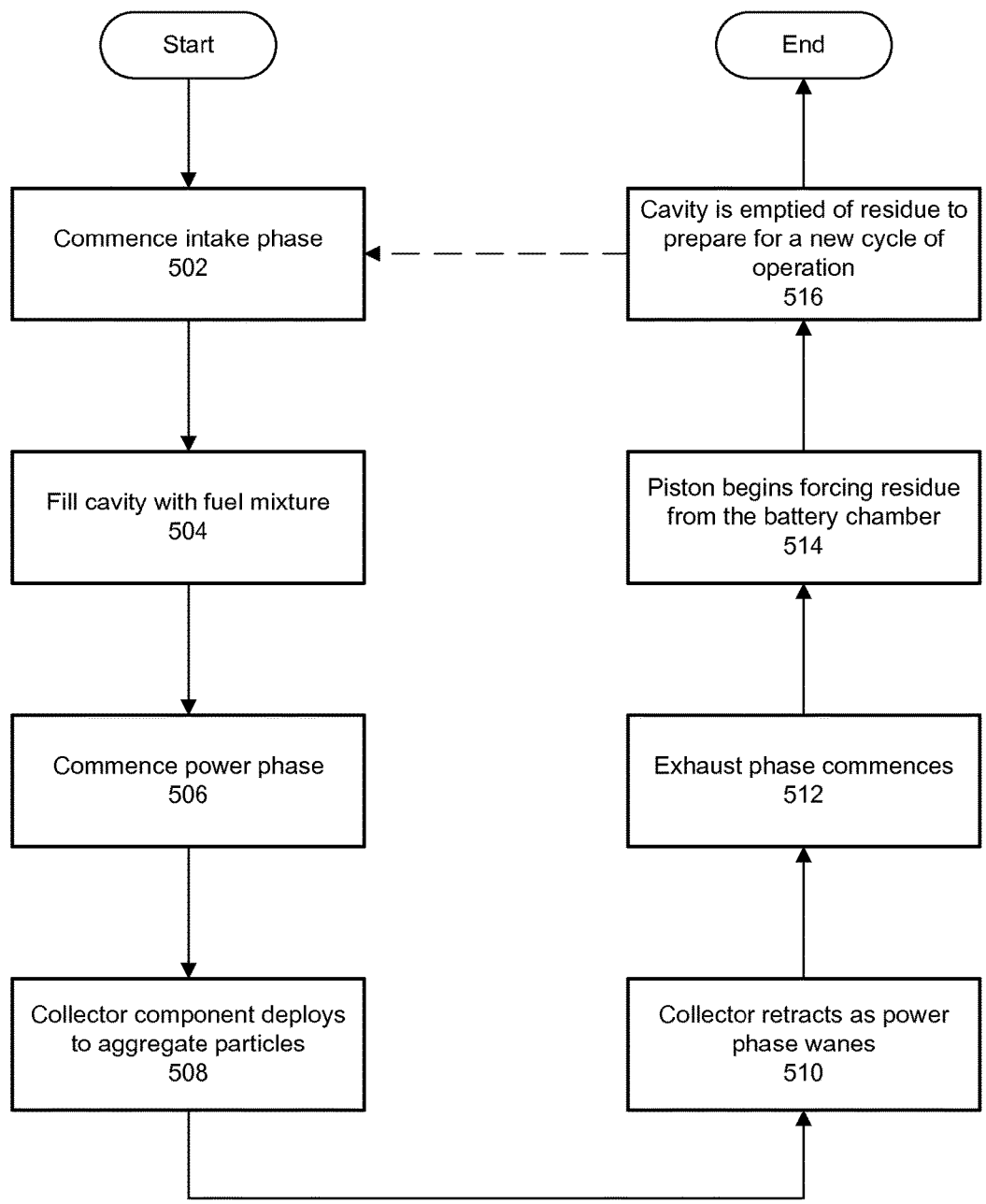
FIG. 5 is a flow chart illustrating a method of refueling a refuelable electrochemical battery, in accordance with some embodiments of the invention.

FIG. 5 is a flow chart illustrating a method of refueling a refuelable electrochemical battery, according to some embodiments of the invention.

In operation 502, the intake phase commences. In some embodiments, this may entail opening a valve connecting a feed tube to the intake port and/or closing a valve in the exhaust port. For example, in some implementations, only the intake port or the exhaust port can be open at a given time (and either or both may be closed during the power generation phase). Illustratively, a single gate or lever may rotate or otherwise move from a position blocking the exhaust port (during the intake phase) to a position blocking both ports (during the power phase) to a position blocking the intake port (during the exhaust phase), and back again as needed.

In operation 504, a predetermined mixture of a suitable electrolyte and a suitable mass of electrochemically active particles or pellets is pumped into or drawn into the battery cavity. In some implementations, withdrawal of a piston may assist in the formation of a vacuum to help draw the fuel into the battery. A sensor may detect when the mixture has filled the cavity to a suitable level, the amount of mixture delivered may be measured as it is fed into the cavity, or some other mechanism may be used to determine when the cavity is sufficiently full and when the fuel flow should cease.

In operation 506, the power stage of the battery's operation commences. This may occur even as fuel is still being added, or may occur after fuel delivery ceases (and the intake port is closed or blocked by an insulating obstruction).

In operation 508, during the power stage, one or more collector components mechanically force the electrochemically active particles together in order to facilitate the charge flow. The collector component(s) may extend and/or retract multiple times to gather particles that have not been spent, and/or to stir up the electrolyte to allow continuation of the electrochemical reaction, or may extend just once.

In some implementations, a collector component deploys incrementally to compact or combine the particles as they dissolve and shrink in size. For example, the collector may initially deploy or extend a significant distance and then pause when it encounters sufficient resistance (or reaches a predetermined degree or amount of extension). After some period of time (e.g., minutes) it may deploy further until again encountering sufficient resistance, and so on.

In operation 510, as the power output wanes (or when it ceases), the collector component(s) retracts to its resting position. The resting position may be configured to accommodate the exhaust phase and the next intake phase.

In operation 512, the power phase ends as the exhaust phase commences. This operation may include opening the exhaust port or a valve or lever that had closed the port.

In operation 514, a piston begins extending longitudinally into the battery cavity to start forcing out the residue of the electrochemical reaction. In some embodiments, a distal end of the piston (external to the battery cavity) is coupled to a cam or other mechanism for transitioning between extending the piston into the battery cavity, withdrawing from the cavity, and resting in either or both the extended or withdrawn positions.

In operation 516, the cavity is (substantially) emptied of residue and the exhaust port or valve may be closed. After operation 516, the method may end or may return to operation 502 to begin a new cycle of operation.

In some embodiments, the electrical energy output by a refuelable electrochemical battery is directly fed to an active load (e.g., to run an electrically powered vehicle, to power a piece of equipment). In some other embodiments, the output is used to charge another battery or other electrical storage device and/or is used to provide power for conducting one or more phases of operation of another battery.

In the preceding description, 'some embodiments' refers to a subset of all possible embodiments, but does not always specify the same subset of embodiments.

An environment in which some embodiments of the invention are executed may incorporate a general-purpose computer or a special-purpose device such as a hand-held computer or communication device. Some details of such devices (e.g., processor, memory, data storage, display) may be omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Methods and processes described in the detailed description can be embodied as code and/or data, which can be stored in a non-transitory computer-readable storage medium as described above. When a processor or computer system reads and executes the code and manipulates the data stored on the medium, the processor or computer system performs the methods and processes embodied as code and data structures and stored within the medium.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A refuelable electrochemical battery, comprising:
   an electrochemical cell having a cavity;
   an intake port for admitting a mixture of a fluid and electrochemically active particles into the cavity;
   a collector, within the cavity, for mechanically gathering the electrochemically active particles; and
   an exhaust port.

2. The electrochemical battery of claim 1 wherein a portion of a wall of the cavity is composed of a non-electrically conductive gas permeable membrane having an interior surface interior to the cavity and an exterior surface exterior to the cavity.

3. The electrochemical battery of claim 2, further comprising:
   an anode current collector; and
   a gas-diffusion cathode in contact with the exterior surface of the membrane.

4. The electrochemical battery of claim 3, wherein the collector comprises the anode current collector.

5. The electrochemical battery of claim 3, wherein, during operation of the electrochemical battery, the anode current collector traverses the cavity toward the interior surface of the membrane.

6. The electrochemical battery of claim 1, wherein:
   the collector is perforated; and
   an average diameter of the perforations is less than an average diameter of the electrochemically active particles.

7. The electrochemical battery of claim 1, further comprising:
   a piston having an axis collinear with an axis of the cavity;
   wherein the piston moves in a first direction along the axis during admission of the mixture through the intake port;
   and the piston moves in a second direction along the axis substantially opposite to the first direction to eject residue of an electrochemical reaction within the battery through the exhaust port.

8. The electrochemical battery of claim 1, wherein the collector is alternatingly extended and retracted during operation of the electrochemical battery.

9. The electrochemical battery of claim 8, wherein:
the collector is extended through the cavity after admission of the mixture; and
the collector is subsequently retracted substantially coplanar with a surface of the electrochemical battery.

10. The electrochemical battery of claim 1, wherein:
the electrochemically active particles are particles of metal; and
the fluid is an electrolyte solution.

11. The electrochemical battery of claim 10, wherein:
the metal is aluminum; and
the electrolyte is one of sodium hydroxide and potassium hydroxide.

12. A refuelable electrochemical battery, comprising:
an electrochemical cell having a cavity;
an intake port for admitting a mixture of a fluid and electrochemically active particles into the cavity;
a filter for mechanically gathering the electrochemically active particles; and
an exhaust port.

13. A method of operating the refuelable electrochemical battery of claim 1, the method comprising:
admitting via the intake port the mixture of the fluid and electrochemically active particles into the cavity;
mechanically collecting the electrochemically active particles in contact with an anode current collector;
drawing electrical current from the electrochemical battery; and
expelling via the exhaust port residue resulting from dissolution of the particles within the fluid.

14. The method of claim 13, wherein the electrochemically active particles are suspended in the fluid during said admitting.

15. The method of claim 13, wherein mechanically collecting the electrochemically active particles comprises:
extending the collector into the cavity to force together the electrochemically active particles.

16. The method of claim 13, wherein mechanically collecting the electrochemically active particles comprises:
extending multiple conductive collector components, including the collector, into the cavity to force together the electrochemically active particles.

17. The method of claim 13, wherein expelling residue comprises:
extending a piston through the cavity to force the residue through the exhaust port.

18. The electrochemical battery of claim 7, wherein:
the collector is alternatingly extended and retracted during operation of the electrochemical battery; and
an axis of movement of the collector is substantially orthogonal to the axis of the piston.

19. The electrochemical battery of claim 9, wherein:
as the collector is extended through the cavity and as the collector is subsequent retracted, the collector flexibly maintains contact with multiple walls of the electrochemical cell that form the cavity.

20. The electrochemical battery of claim 1, wherein:
the cavity is cylindrical and is defined by a top, a bottom and a wall of the electrochemical cell; and
the intake port and the exhaust port are co-located on one of the top and the bottom of the electrochemical battery.

* * * * *